UNITED STATES PATENT OFFICE.

CARLETON ELLIS, OF MONTCLAIR, NEW JERSEY, ASSIGNOR OF TWO-THIRDS TO ELLIS-FOSTER COMPANY, A CORPORATION OF NEW JERSEY, AND ONE-THIRD TO CHARLES L. PARSONS, OF WASHINGTON, DISTRICT OF COLUMBIA.

OXIDATION PROCESS.

1,103,017.      Specification of Letters Patent.      Patented July 7, 1914.

No Drawing.     Application filed September 16, 1912. Serial No. 720,497.

*To all whom it may concern:*

Be it known that I, CARLETON ELLIS, a citizen of the United States, and a resident of Montclair, in the county of Essex and State of New Jersey, have invented certain new and useful Improvements in Oxidation Processes, of which the following is a specification.

This invention relates to a process of making sulfuric acid or sulfuric anhydrid by contact of sulfurous acid with a catalyzer preferably carrying selenium or tellurium or similar non-metallic elements or compounds thereof.

In the manufacture of sulfuric acid platinum has been used extensively as a contact material and has shown great susceptibility to the action of certain bodies denoted as catalyzer poisons, including arsenic and so forth, so that the purification of the gases which are to pass through the catalyzer material has to be carried out with great care and at a high cost. It has also been proposed to use oxid of iron as a catalytic material, but in this case the conversion is very poor so that a large amount of sulfurous acid passes through the catalyzer unchanged and has to be treated finally by the aid of the active platinum bodies.

In the present invention it is one object among others to provide a process which does not call for the same complete or extreme purification of the gases or in which purification, except for the purpose of removing dust, may be eliminated entirely. For this purpose, I employ in the process of the present invention a catalyzer of the type of tellurium or certain of its compounds, or other similar allied bodies. Selenium may be likewise employed, but the tellurium is preferable owing to higher volatilization point. Tellurium compounds are in some cases volatile in a current of highly heated air and care should therefore be taken to maintain the temperatures, under such circumstances, below the volatilization or subliming point of the catalytic material. Besides the elements tellurium and selenium, one may use, as stated, other compounds thereof, such as selenium dioxid, selenious acid, selenic acid and other compounds of selenium. Also tellurium monoxid and dioxid, tellurous acid, tellurium trioxid and telluric acid, and the salts of these acids such as selenites and selenates; tellurates and tellurites of the alkalis and alkaline earths and of the higher metals.

In order to secure a suitable surface of contact, I preferably distribute material over a support such as fragments of pumice, asbestos fiber, fullers' earth, charcoal and the like. Or, I may use water soluble salts as a temporary supporting basis and wash out the salt after formation of the catalytic material, so as to produce a skeleton of the catalytic body. Or a water soluble salt may be used as a supporting material throughout the operation.

As an example of the operation of catalytic material asbestos fibers are impregnated with a solution of tellurium or telluric acid and then treated with sulfur dioxid to precipitate the tellurium coating *in situ*. This mass may then be purified and formed into a deep bed which may be heated by externally applied heating means up to the temperature required for starting the catalytic operation. Through the catalytic bed is passed a mixture of air or oxygen, steam or water, vapor of sulfurous acid or equivalent bodies. The catalyzer acts to carry oxygen to the sulfurous acid and with the moisture present sulfuric acid is formed. It is sometimes desirable to have an excess of moisture present, because of its favorable action to the oxygen, but under certain circumstances the proportion of water may be considerably reduced or even entirely omitted. The air or oxygen supply preferably also should be in excess, this being, however, variable with respect to other conditions. In order to avoid clogging of the catalyzer bed it is desirable to remove the dust carried by the gases derived from pyrites burners or other sources. The removal of bodies poisonous to platinum is not usually necessary or desirable. Washing the gases essentially to remove the dust in general suffices to put the gas in condition for passage through the catalyzer bed. The temperature employed should be below that of the volatilizing point of the catalyzer, and of course, should be kept below the point at which sulfuric andhydrid dissociates to any objectionable degree. It may even become necessary to cool the porous catalyzer bed after the process is well under way in order to prevent these undesirable occurrences. It is also desirable to work under a pressure of one or two atmospheres, although ordinary atmospheric pressure may be employed, especially with a catalyzer of a highly sensitive nature.

The vigor of tellurium compounds is generally enhanced by the presence of a small amount of an activating material. Selenium and other similar bodies serve for this purpose, 5 to 15% usually being sufficient. The catalytic material prepared by dissolving tellurium containing traces of selenium in diluted nitric acid, adding asbestos fibers to absorb the solution, drying and gently igniting may also be employed. If the nitric acid solution without the asbestos fiber is concentrated a precipitate of tellurium dioxid forms which may be made the basis of a catalytic material. The amount of moisture which under some circumstances may be present during the contact of sulfur dioxid with the catalyzer may be that which suffices merely to form sulfuric acid or the proportion may be larger, so that somewhat diluted acid forms.

No drawings are shown in the present application as the process is clear from the foregoing without graphic delineation.

What I claim is:—

1. The process of oxidizing sulfur dioxid and forming sulfuric acid which comprises bringing a mixture comprising sulfur dioxid and oxygen into contact with essentially a non-acid, non-metallic catalytic body consisting substantially of metalloidal bodies; said catalytic body being substantially unaffected in its catalytic action in the conversion of sulfur dioxid into sulfur trioxid in the presence of small quantities of bodies toxic to metallic catalyzers.

2. In the process of making sulfuric acid, the step of oxidizing sulfur dioxid which comprises contacting moist sulfur dioxid with tellurium containing material in the presence of regulated quantities of oxygen.

3. The process of making sulfuric acid which comprises bringing a mixture comprising sulfur dioxid, oxygen and water vapor into contact with a tellurium containing catalyzer carrying traces of a selenium activator.

4. The process of making sulfuric acid which comprises bringing a mixture comprising sulfur dioxid, oxygen and water vapor, all in an unpurified condition but free from dust, into contact with a catalyzer of tellurium containing material carrying traces of a selenium activator.

5. The process of making sulfuric acid which comprises bringing a mixture comprising sulfur dioxid, oxygen and water vapor, all in an unpurified condition but free from dust, into contact with a heated tellurium containing catalyzer carrying traces of a selenium activator.

6. The process of making sulfuric acid which comprises bringing a mixture comprising sulfur dioxid, oxygen and water vapor, all in an unpurified condition but substantially free from dust, under pressure into contact with a heated tellurium containing catalyzer carrying traces of a selenium activator.

7. The process of making sulfuric acid which comprises bringing a mixture comprising sulfur dioxid, oxygen and water vapor, all in an unpurified condition but substantially free from dust, under pressure into contact with a catalyzer comprising tellurium and selenium material.

8. The process of making sulfuric acid which comprises bringing a mixture comprising sulfur dioxid, oxygen and water vapor into contact with an oxid of tellurium.

9. In the process of making sulfuric acid the step of oxidizing sulfur dioxid which comprises bringing a mixture comprising sulfur dioxid and oxygen into contact with a porous bed of catalyzer comprising tellurium dioxid.

10. In the process of making a sulfuric acid, the step of oxidizing sulfur dioxid which comprises passing a mixture comprising air and sulfur dioxid through a porous bed containing catalytic tellurium containing material maintained at a temperature substantially above atmospheric but below the volatilizing point of said material.

11. In the process of making a sulfuric acid, the step of oxidizing sulfur dioxid which comprises passing a mixture comprising air and sulfur dioxid under pressure through a deep bed of heated tellurium containing material supported on an inert carrier.

12. In the process of making sulfuric acid, the step of oxidizing sulfur dioxid which comprises mixing with an oxygen carrying gas and contacting the mixture with tellurium containing material.

13. In the process of making sulfuric acid, the step of oxidizing sulfur dioxid which comprises contacting sulfur dioxid in the presence of oxygen with mixed tellurium and selenium material.

Signed at Montclair in the county of Essex and State of New Jersey this 13th day of September A. D. 1912.

CARLETON ELLIS.

Witnesses:
B. M. ELLIS,
F. CARBUTT.